US010108333B2

(12) United States Patent
Abrahams et al.

(10) Patent No.: US 10,108,333 B2
(45) Date of Patent: Oct. 23, 2018

(54) INFERRING INSIGHTS FROM ENHANCED USER INPUT

(71) Applicant: International Business Machines Corporation, Armonk, NY (US)

(72) Inventors: Faried Abrahams, Laytonsville, MD (US); Kerrie L. Holley, Montara, CA (US); Gandhi Sivakumar, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 14/751,272

(22) Filed: Jun. 26, 2015

(65) Prior Publication Data

US 2016/0378328 A1 Dec. 29, 2016

(51) Int. Cl.
G06F 3/00 (2006.01)
G06F 15/16 (2006.01)
H04W 4/00 (2018.01)
G06F 3/0488 (2013.01)
H04W 4/02 (2018.01)

(52) U.S. Cl.
CPC .......... G06F 3/04883 (2013.01); H04W 4/02 (2013.01)

(58) Field of Classification Search
CPC . G06F 3/048; G06F 3/00; G06F 15/16; G06F 17/30; G06F 21/00; H04L 63/00; H04W 4/00

See application file for complete search history.

(56) References Cited

U.S. PATENT DOCUMENTS

| 8,843,839 | B1 | 9/2014 | Salyers et al. |
| 9,306,899 | B1 * | 4/2016 | Vendrow ............... H04L 51/34 |
| 2010/0070921 | A1 * | 3/2010 | Rieman ................. G06F 15/16 |
| | | | 715/811 |

(Continued)

OTHER PUBLICATIONS

IBM, A method of editing the privacy settings of social networking sites on the fly and previewing the page content for the changed settings, Original Publication Date May 27, 2009, IP.com No. 000183560, 6 pages.

(Continued)

*Primary Examiner* — Hugo Molina
(74) *Attorney, Agent, or Firm* — Schmeiser, Olsen & Watts, LLP; Michael Petrocelli

(57) ABSTRACT

A method and associated systems for inferring insights from enhanced user input. A computerized messaging system identifies a user operating a mobile, location-enabled, "scribble" device and associates the user or the device with a domain of interest or with other metadata that characterizes the user. When the user enters an ad hoc "scribble" input via the device, the system automatically tags the input with the user's location, with sensory data received from one or more sensor devices, and with ancillary data received from extrinsic data repositories. The system may then consider this ancillary and sensory data in order to identify or infer rules or insights associated with the user and the scribble. These rules may then be used to identify targeted, user-specific steps to perform in response to receiving the scribble, where these user-specific steps accommodate a user preference without exposing confidential user information to a public data repository.

11 Claims, 2 Drawing Sheets

(56) References Cited

U.S. PATENT DOCUMENTS

| | | | | |
|---|---|---|---|---|
| 2012/0182309 A1* | 7/2012 | Griffin | ............... | H04W 4/14 345/619 |
| 2012/0232956 A1* | 9/2012 | Dilip | ............... | G06Q 30/02 705/7.33 |
| 2012/0235819 A1* | 9/2012 | Watkins | ............... | A61B 5/18 340/573.1 |
| 2013/0132488 A1* | 5/2013 | Bosworth | ............... | H04L 51/32 709/206 |
| 2013/0227441 A1* | 8/2013 | Cockcroft | ............... | G06F 17/30873 715/760 |
| 2014/0015780 A1* | 1/2014 | Kim | ............... | G06F 3/01 345/173 |
| 2014/0032359 A1 | 1/2014 | Dewangan | | |
| 2014/0143333 A1 | 5/2014 | Dodge | | |
| 2014/0250143 A1* | 9/2014 | Dai | ............... | G06F 17/30477 707/769 |
| 2015/0120617 A1* | 4/2015 | C. | ............... | G06N 5/027 706/11 |
| 2015/0331557 A1* | 11/2015 | Fish | ............... | G06F 3/04847 715/773 |
| 2016/0026736 A1* | 1/2016 | Natarajan | ............... | G06F 17/30997 707/694 |
| 2016/0162913 A1* | 6/2016 | Linden | ............... | G06Q 30/0202 705/7.31 |

OTHER PUBLICATIONS

Motorola, Progressive display of user interests, Original Publication Date Feb. 11, 2008, IP.com No. 000167391, 7 pages.

IBM, Method and Apparatus employing Heuristic Processing for improved Diarying Function, Original Publication Date Mar. 29, 2005, IP.com No. 000114547, 4 pages.

* cited by examiner

INFERRING INSIGHTS FROM ENHANCED USER INPUT

TECHNICAL FIELD

The present invention relates inferring a meaning of an ad hoc user input and responding to that input as a function of the inferred meaning.

BACKGROUND

Social media, e-commerce, "Big Data," and other modern computing paradigms and applications may access, store, and use information entered online by users through blogs, personal Web pages, online forums, social-media outlets, and other online venues. Organizations that leverage data from an internal source, such as a call center, a tech-support operation, a customer-management or CRM function, or a marketing or sales department, could benefit from augmenting this internally generated data with ancillary data captured or inferred from public or private, user-generated or commercial, online sources. Such an effort may, however, be hampered by inefficiencies and constraints that include:

- security issues that arise when interfacing with, or when importing information from, ad hoc online sources, or when attempting to enhance user data retrieved from such a source by allowing that source to associate user-entered data with personally identifying information;
- an inability to identify or fully characterize individuals who choose not to disclose their identities in a public form;
- a likelihood of omitting important information that was posted in a lower-priority or lower-popularity online venue;
- a difficulty of inferring meaning and patterns from, and in recognizing relationships among, user entries that are received without context; or
- an inability to provide a customized experience to users who desire special treatment based on a personal characteristic, such as a preferred status, a medical condition, or a dietary requirement.

There is thus a need for a way to allow a user to identify itself or a set of its special needs in a public or privately managed venue or data repository, such that: i) the entered data may be enriched with context and inferences that allow an application to give the user a customized experience; and ii) to do so without compromising the user's personal security or privacy.

BRIEF SUMMARY

A first embodiment of the present invention provides a method for inferring insights from enhanced user input comprising:

a computerized communications system accessing information that characterizes a user;

the system accepting a scribble data entered by the user, wherein the scribble data comprises data entered by the user on a scribble device, and wherein the scribble device is a mobile device capable of communicating with the system;

the system associating the user with a location;

the system receiving sensory metadata associated with the scribble data from a set of physical sensor devices;

the system retrieving ancillary data in response to the accepting the scribble data;

the system enhancing the scribble data with the ancillary data and the sensory metadata; and the system identifying, as a function of the enhanced scribble data, an insight related to the user.

A second embodiment of the present invention provides a computerized communications system comprising a processor, a memory coupled to the processor, a scribble device, wherein the scribble device is a mobile device capable of communicating with the system, and a computer-readable hardware storage device coupled to the processor, the storage device containing program code configured to be run by the processor via the memory to implement a method for inferring insights from enhanced user input comprising:

the system accessing information that characterizes a user, wherein the information is selected from a group comprising: a unique identifier of the user, a domain of interest, and a user-defined personal preference;

the system accepting a scribble data entered by the user, wherein the scribble data comprises data entered by the user on the scribble device;

the system associating the user with a location;

the system receiving sensory metadata associated with the scribble data from a set of physical sensor devices;

the system retrieving ancillary data in response to the accepting the scribble data;

the system enhancing the scribble data with the ancillary data and the sensory metadata; and the system identifying, as a function of the enhanced scribble data, an insight related to the user.

A third embodiment of the present invention provides a computer program product, comprising a computer-readable hardware storage device having a computer-readable program code stored therein, the program code configured to be executed by a computerized communications system comprising a processor, a memory coupled to the processor, and a computer-readable hardware storage device coupled to the processor, the storage device containing program code configured to be run by the processor via the memory to implement a method for inferring insights from enhanced user input comprising:

the system accessing information that characterizes a user;

the system accepting a scribble data entered by the user, wherein the scribble data comprises data entered by the user on the scribble device;

the system associating the user with a location;

the system receiving sensory metadata associated with the scribble data from a set of physical sensor devices;

the system retrieving ancillary data in response to the accepting the scribble data;

the system enhancing the scribble data with the ancillary data and the sensory metadata; and the system identifying, as a function of the enhanced scribble data, an insight related to the user.

DETAILED DESCRIPTION

Figure 1:
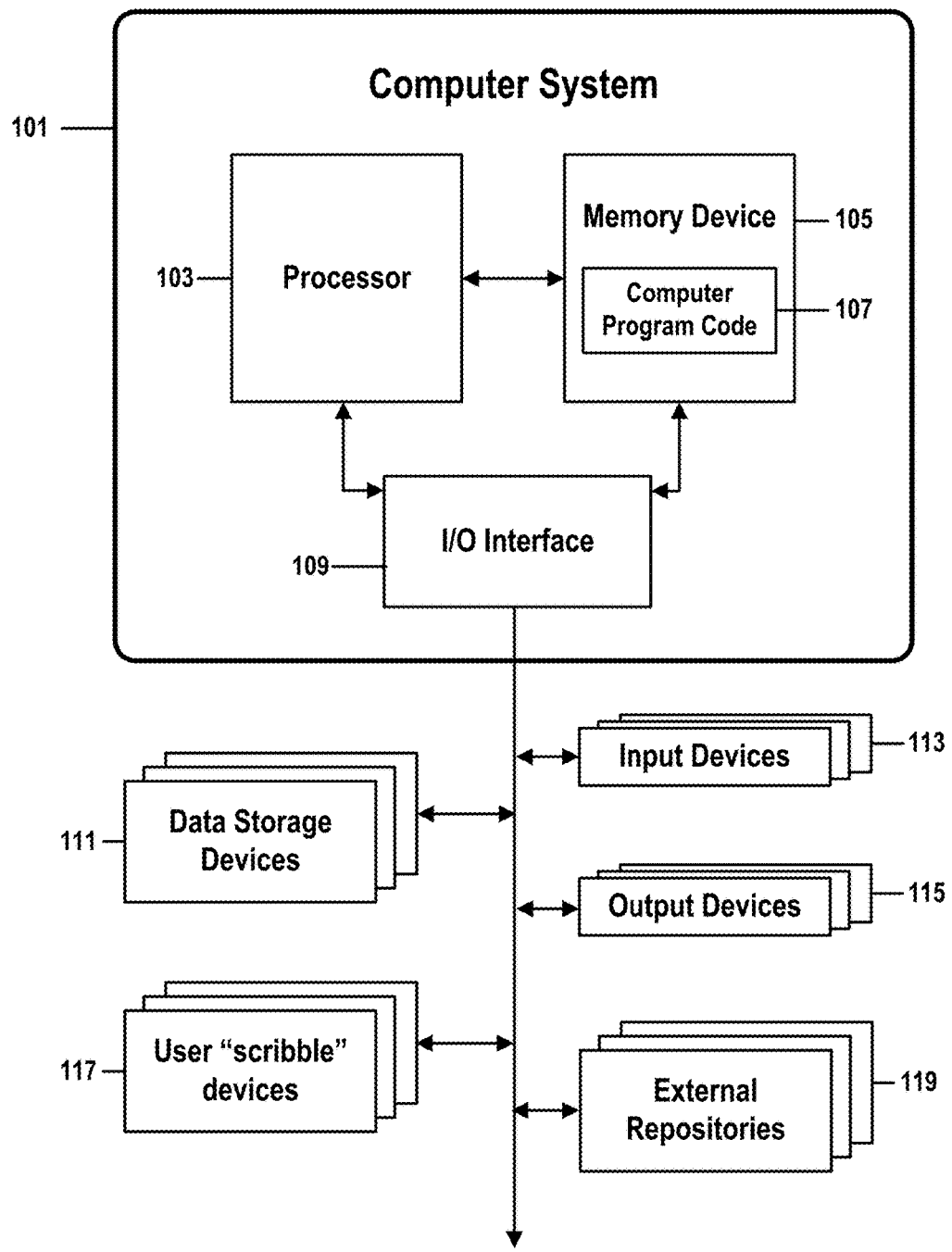
FIG. 1 shows a structure of a computer system and computer program code that may be used to implement a method for inferring insights from enhanced user input in accordance with embodiments of the present invention.

FIG. 1 shows a structure of a computer system and computer program code that may be used to implement a method for inferring insights from enhanced user input in accordance with embodiments of the present invention. FIG. 1 refers to objects 101-119.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

In embodiments described herein, input devices 113 may include one or more "sensory" devices that gather contextual or ancillary "sensory" data related to a user, to information entered by the user, or to other data gathered in relation to a user input. Sensory data that, for example, identifies a user's physical location might be gathered by a GPS unit in proximity with a particular user or incorporated into a device (such as a scribble device 117) associated with the user. Other sensory-input devices 113 might comprise temperature or humidity sensors, an accelerometer, or a pulse-measuring device.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for inferring insights from enhanced user input in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for inferring insights from enhanced user input.

Any of the components of the present invention could be created, integrated, hosted, maintained, deployed, managed, serviced, supported, etc. by a service provider who offers to facilitate a method for inferring insights from enhanced user input. Thus the present invention discloses a process for deploying or integrating computing infrastructure, comprising integrating computer-readable code into the computer system 101, wherein the code in combination with the computer system 101 is capable of performing a method for inferring insights from enhanced user input.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for inferring insights from enhanced user input may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for inferring insights from enhanced user input data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Figure 2:
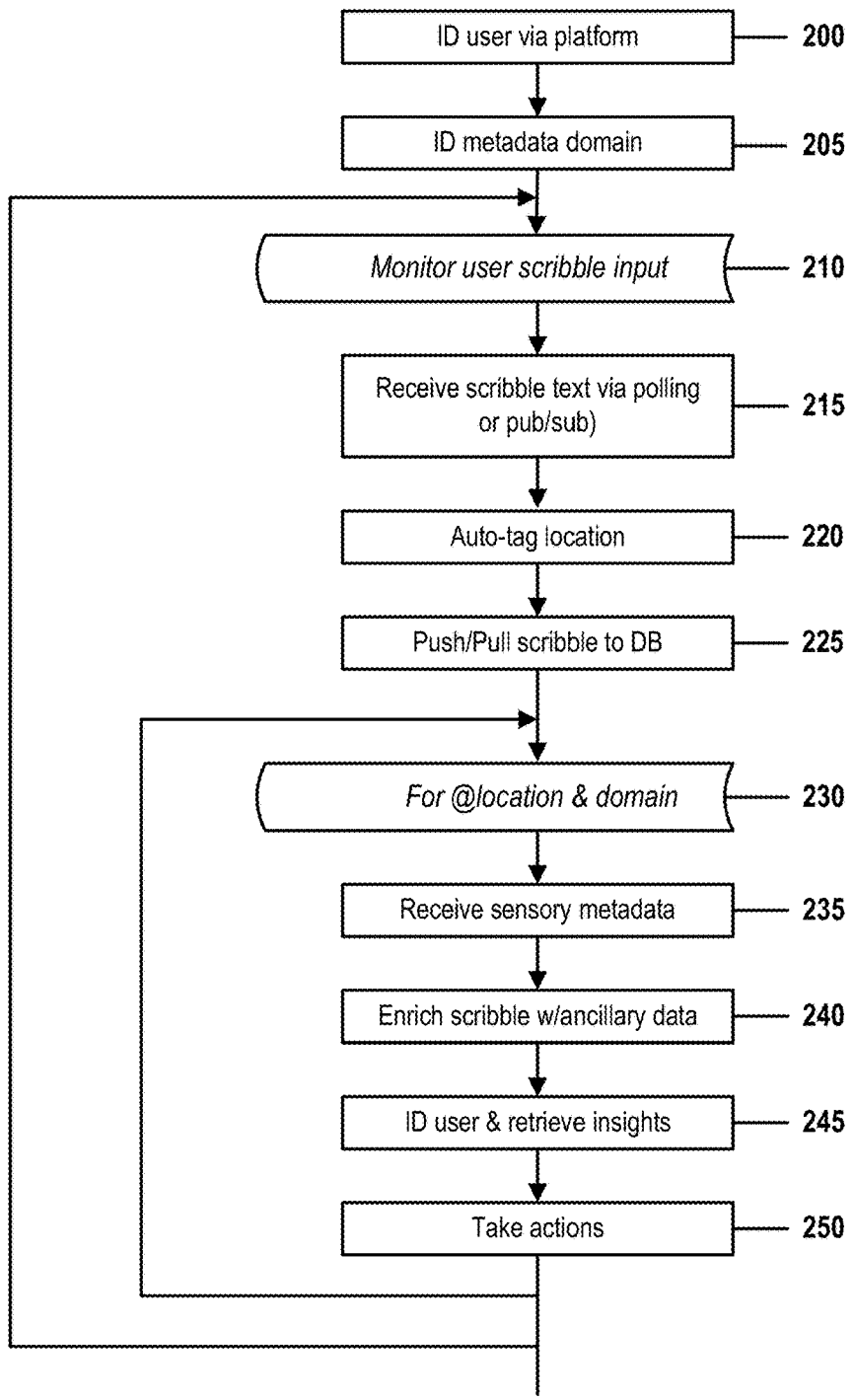
FIG. 2 is a flow chart that illustrates steps of a method and systems for inferring insights from enhanced user input in accordance with embodiments of the present invention.

Embodiments of the present invention may further comprise one or more hardware or software "scribble" devices 117 by which users may enter "scribble" data described in FIG. 2. Other embodiments may comprise only an interface mechanism to one or more scribble devices 117, such as a telecommunications interface, a cellular connection, or a wired or wireless connection to the Internet or to a cloud-computing environment. In some embodiments, a scribble pad 117 may be a virtual device provisioned in a virtualization layer of a cloud-computing environment or running as a software application on a computing device. A scribble device may be any mobile, personal, desktop, fixed, or other computerized or electronic device that is capable of recognizing and identifying one or more users.

Computer system 101 may be further connected to one or more information repositories 119 through any interface or communications mechanism known in the art. These repositories might, for example, comprise a combination of social-media Web sites; publish/subscribe-based ("pub/sub"), polling-based, or other types of push or pull communications platforms; a knowledgebase; a "Big Data" data warehouse; a database; a distributed storage platform that may span multiple devices or sites; an archival storage platform; a virtual or cloud-based storage repository; a Web site; a mobile storage device; a server farm; or any other type of platform on which large amounts of data may be stored, organized, and retrieved.

In some embodiments, the present invention may comprise an integrated computerized communications system that comprises all of computer system 101 and its related peripherals, an elaborated multi-port or multiple-medium communications interface 109, and a set of one or more scribble devices 117 designed to communication through interface 109 to computer system 101. In other embodiments, the present invention may further comprise external public or private repositories 119 and a communications interface or other mechanism 109 capable of one-way or bidirectional communications with repositories 119.

Some embodiments may comprise two or more classes of repositories 119 that may, in some instances overlap. One type of repository 119 may, for example, aggregate and store data culled from public databases, social-media services, and other publicly accessible resources. An other type of repository 119 might then comprise internal or private storage platforms upon which the computerized system might store ancillary or enhanced data that it has aggregated, inferred, organized, or otherwise generated as a function of user input, sensory input, and data gathered from other sources.

Embodiments of the present invention may be implemented as a method performed by a processor of a computer system, as a computer program product, as a computer system, or as a processor-performed process or service for supporting computer infrastructure.

FIG. 2 is a flow chart that illustrates steps of a method and systems for inferring insights from enhanced user input in accordance with embodiments of the present invention. FIG. 2 contains steps 200-250, which may be performed by embodiments that incorporate or operate upon a platform similar to components shown in FIG. 1.

In step 200, a computerized system identifies a user of a "scribble" device 117 through any means known in the art. As described in FIG. 1, a scribble device 117 may comprise a combination of hardware and software components, such as a mobile device, a desktop computer, a home-entertainment device, or a virtual device provisioned in a cloud-computing environment, that allow a user to enter a comment, fill in a form, answer a question, gesture, display a visual or audio characteristic, or actively or passively transfer any other type of information to the scribble device 117. In some embodiments, a scribble device 117 may include a graphical user interface that allows a user to enter information by typing on a real or virtual keyboard, by gesturing on a touch-sensitive screen, or by other means known in the art.

The computerized system identifies the scribble-device user in step 200 through means that may include detecting a hard-coded device address, a network address, a physical location, a user-entered identifier, or some other unique or non-unique identifier.

In some embodiments, the system may in turn use this identification to reveal further information about the user. In one example, the system may infer a context associated with a user or with a scribble entered by a user, or may determine an action to take in response to user-entered "scribble" data. Such actions may be performed, for example, by pulling user-specific data from a repository like a user's diary or a set of user attributes, where such a repository may be stored on a cloud-computing platform, on a personal or mobile device, on an other user-owned device or platform, or on an other type of public, private, user-specific, or user-nonspecific storage medium or device known to those skilled in the art.

If, for example, a user ID identified in this step is associated with a medical-alert record that identifies the user's severe food allergy, then the computerized system would take this information into account when later recommending a dining venue to the user in response to a scribble. In a related example, an embodiment that automatically identifies a restaurant and makes a dinner reservation in response to a user scribble might use the associated medical-alert record to note the user's allergy on the dinner-reservation form. In this way, embodiments of the present invention may accommodate a user's special needs without disclosing the user's medical condition to a publicly accessible data repository.

In step 205, the system identifies a metadata space or domain associated with scribbles entered by the user identified in step 200. Within a context of the present invention, a scribble may be any sort of user-entered data, and generally comprises ad hoc information entered by a user through an interactive user interface of a scribble device 117. A scribble may comprise a graphic, text, a gesture, passively entered data (such as a facial recognition), or other type of input.

A domain may provide one or more contexts that facilitate interpretation of a user-entered scribble. A domain associated with a particular user may change as a function of an action of the user, of a component of the computerized system, of user-entered scribble data, or of extrinsic data, such as information retrieved from an external repository 119 or sensory data received from a sensory-input device 113.

A domain may be selected from a list, may be chosen from a hierarchical structure, such as a graph or tree, may be retrieved from a database or knowledgebase, or may be received from an other type of information repository or from a computer application. If, for example, a user is scribbles information about a restaurant (that is, enters that information via the scribble device 117), context may be selected for that scribble may by traversing a hierarchically arranged set of topics. In such a case, a domain might be identified by a path "United States/New York State/New York City/Restaurants/Asian cuisine/Thai cuisine." This domain would allow the system to interpret a scribble that reads "menu" to mean that a user seeks a menu of a Thai restaurant in New York City.

In some embodiments, a user may be associated with multiple domains. In the above case, for example, a second, distinct, domain "Vegetarian/Budget-priced" associated with the user, the scribble device, or the scribble itself might provide further context that allows the system to interpret the user's scribble as a request to retrieve a menu of a New York City Thai restaurant that includes low-priced vegetarian dishes.

Step 210 begins a top-level iterative process, comprised of steps 210-250, that runs once each time the user enters one or more "scribble" data inputs by means of scribble device 117. Each iteration of this procedure processes one entered scribble input or one set of aggregated, related, or associated scribble inputs.

In step 215, the computerized system receives one or more user "scribble" inputs. It may receive this user input through any means known in the art. In a system that employs a publish/subscribe "push" messaging architecture, for example, a user may "publish" (or enter) a scribble that is automatically forwarded to the "subscriber" computerized system in response to the publication. In an embodiment that comprises a "pull" polling messaging architecture, however, the system may instead actively retrieve data from one or more users' scribble devices 117 by periodically determining whether a user has entered data into the scribble device 117 that has not yet been retrieved by the system. Embodiments of the present invention may comprise either of these architectures, a combination of the two, or an other type of communications architecture known to those skilled in the art.

Some embodiments may allow nontextual or partially nontextual scribbles to be entered and processed. A scribble might, for example, comprise a photograph, a hand-drawn figure, or a World Wide Web URL. In such cases, the scribble would still be tagged with metadata and further processed in accordance with further steps of the method of FIG. 2. In other embodiments, an entered scribble data may comprise combinations of a graphic, an image, a "like," "dislike," "follow," or other binary attribute, structured or freeform text, or other types of user-entered information.

In one example, if a user scribbles (enters, forwards, identifies, links to, or sends) a photograph, either by means of a camera integrated into the scribble device 117 or by retrieving or forwarding a previously created photograph, subsequent steps of the method of FIG. 2 might associate that received scribbled photograph with metadata by performing a graphical analysis of the photograph, by performing an image-matching function that attempts to locate a similar image stored in an image database, or by analyzing textual tags already associated with the photograph. As described below, this association may be a further function of sensory data input (generated by a sensor device, such as a temperature, wind, humidity, precipitation, power-consumption, motion, or gesture sensor) associated with the user, with the scribble device, with the scribble, or with previously stored data.

In some embodiments, a scribbled image may be stored on a memory of, or associated with, a scribble device 117 itself, or as part of a user's personal gallery or diary, and that personal image may be tagged with confidential metadata accessible exclusively or nonexclusively by the user and by the computerized system. Other means known to those skilled in the art may be used to identify or provide context or meaning to such graphical content in a similar manner.

In step 220, embodiments of the present invention may automatically tag the scribble received in step 215 with location data that identifies a physical location of a user. This data may be generated by any means known in the art, such as by means of a GPS known to be in proximity to the user, or by means of stored or inferred information that identifies or predicts the user's location at the time that the user enters the scribble.

In some embodiments, this auto-tagging function may be repeated at one or more later times. In one example, if a user's scribble indicates that the user is walking around town looking for a particular type of restaurant, a GPS or other location-identifying mechanism incorporated into or accessible to the scribble device 117, may periodically update the current known value of the user's physical location. In such cases, the location data may be determined or inferred by the computerized system itself, or may be forwarded to the system by a push communications mechanism, a pull communications mechanism, an other means of transferring data to the system, or by a combination thereof. Some embodiments may infer or identify further characteristics of the user by identifying a pattern among the received location data. If, for example, a set of location identifications suggest that a user is walking along a particular street, an embodiment may use this information to infer a probable destination or purpose associated with the user's direction or pace.

In step 225, the system transmits the scribble data, along with any inferred or otherwise-collected metadata, to an external repository 119, such as a public "Big Data"-type data warehouse or a database of a large e-commerce information aggregator. Although such repositories 119 are often publicly accessible or accessible to a party that pays an access fee, a repository 119 may be privately held or may be a privately owned resource shared by multiple parties.

In some embodiments, step 225 may be performed at a different point in the method of FIG. 2. Step 225 might, for example, not be performed until after some or all of the actions of steps 230-245 have enhanced a received scribble with one or more type of ancillary data, sensory data, or inferred insights. In some embodiments, step 225 may be performed as a step within the inner-nested iterative process of steps 230-250. In some embodiments, received scribble data, enriched or enhanced scribble data (as described in step 240), or other type of data associated with the received scribble may be forwarded or described to one or more external repositories 119 at the point in the method of FIG. 2, as shown in FIG. 2, or at one or other points in the method of FIG. 2. In some embodiments, the timing, sequence, data, or other detail of step 225 may vary, according to any of the optional methods described in this paragraph, in each iteration of the process of step 210-250 or of the process of steps 230-250.

Step 230 begins an inner-nested iterative process of steps 230-250 that may be performed once for each combination of domain and location associated with the scribble currently being processed. If, for example, the aforementioned exemplary "menu" scribble has been associated with "Thai cuisine" and "budget-priced" domains, and further associated with two locations in New York City ("Times Square" and "4th Street and Broadway"), the iterative process of steps 230-250 might be performed four times, once each for the combinations of "Thai cuisine" and "Times Square," of "Thai cuisine" and "4th Street and Broadway," the combinations of "Thai cuisine" and "Times Square" and of "Thai cuisine" and "4th Street and Broadway," resulting in a selection of one of those two combinations, and then once for a combination of "budget-priced" and of the selected "Thai cuisine" combination. Other variations are possible, depending on implementation-dependent financial, business, or technical goals or constraints, or characteristics of a user, a scribble, or an other component of a particular embodiment.

Each such combination might, through methods such as analytics or straightforward database transactions, reveal different information about an intent or meaning of a scribble, or might influence results or other data that is retrieved as a function of the scribble.

In step 235, the system receives sensory metadata from one or more sensory devices 113. These sensory devices 113 may comprise any combination of sensors known to those skilled in the art, including, but not limited to, acoustic, electromagnetic, location-sensing, movement- or gesture-sensing, biometric, voice- or fingerprint-recognizing, and optical sensors. These sensors may be located within proximity to a user or scribble device, may be physically affixed to the scribble device, to a user or to the user's clothing, or to an other wearable device, or may be associated with a user, an activity of a user, or a location or other physical attribute of a user.

In one example, the system may receive local temperature input from temperature sensors 113 embedded into a scribble device 117 or from fixed temperature sensors that communicate wirelessly (via means such as WiFi, a cellular network, or a Bluetooth ad hoc network) with the scribble device 117. When associated with an iteration of steps 230-250 that processes the scribble received in step 210, where that scribble is associated with tagged metadata "Thai cuisine" and "Times Square," the system may be able to further infer that a user would prefer to select a restaurant nearest to the user's current location because the ambient temperature at the user's location indicates that the weather is too hot for a long walk.

In step 240, the computerized system may further associate the user's scribble with ancillary data that is not collected by a sensory input device 113, but which may be received or inferred by the computerized system from a storage repository 119. Such ancillary data may comprise any combination of extrinsic information that might be deemed useful for further interpreting or inferring meaning to the received scribble.

Ancillary data may, for example, comprise a user's cellphone call log, network-usage statistics, Web-browsing history or clicktrack record, email log, online purchase history, or a listing of the user's recent calls to a customer-service center. In such cases, the system may associate this ancillary data with received scribble data, in order to identify a context of the resulting enriched or enhanced scribble or to be more accurately or more precisely determine an action to perform in step 250 in response to receipt of the one or more scribbles in step 215.

In step 245, the system uses the information collected, retrieved, aggregated, organized, or inferred in steps 220, 235, and 240 to identify or infer meaning, context, or intent to the received scribble. This identification or inference may be performed by any means known to those skilled in the art, such as by means of analytics, artificial intelligence software, or a relational database application.

In step 250, the information identified or inferred in step 245 may then be used by an organization or other entity associated with the embodiment, or by third-party entities associated with that organization or other entity in order to perform one or more targeted actions. In some embodiments, the scribble data, its tags, metadata, associated sensory data, and associated ancillary data may all or in part be stored in a private or public third-party database, knowledgebase, or data warehouse, where the third party entity will be able to process the resulting aggregation of data using data-analysis procedures.

Some embodiments may present to a user all or part of this identified or inferred information or may allow a user to edit, correct, delete, or add to all or part of this information.

In one example, if a user's "dinner reservation" scribble has been enhanced by: two or more location tags that identify the user's current location and the direction in which the user is walking; by a "Thai cuisine" domain; by sensory data that reveals that the user's local weather is too cold to facilitate walking a great distance; and by ancillary data that comprises the user's credit-card account number, then the computerized system might infer from the resulting enriched scribble that the user has requested a reservation at a Thai restaurant that is within a short walk from the user's location and in the direction in which the user is walking, and should use the user's credit-card to guarantee that reservation.

If other ancillary information, or other data associated with the user's User ID, identifies that the user adheres to a non-dairy diet, then the system might further constrain its restaurant selection to include only venues known to offer dairy-free menu items.

In another example, a user may enter a scribble "find flights to Aruba." The system may then, according to the method of FIG. 2, associate that scribble with: the user's Florida location; preferences associated with the user's previous flights; an identification of a preferred airline; dietary preferences associated with the user's User ID; credit-card records that identify the user's account number and amount of available credit; and sensory data that confirms the user's identity as a function of input received from the scribble device's voice-recognition biometric-input device.

The system might then store all or part of this data in an third-party airline-aggregating database, in a record format that is compatible with the database, and request that a flight-reservation system associated with the database recommend flights to the user that satisfy all the criteria described above.

In another example, an embodiment may be configured to provide a user certain types of special treatment. If the user enters a scribble that comprises free-flow unstructured text describing the user's experience with a migraine headache earlier that day, the scribble device might respond by forwarding this information to an artificially intelligent "Insights" engine. The engine would then associate relevant information about migraines with existing stored information about the user.

In this example, if the user then visits a known coffee shop that evening, the system might forward the shop information about the user's stored preferences and characteristics and notify the shop about the user's migraine. Based on this received information, the shop owner could instruct a waitress to greet the user with a targeted greeting: "How are you feeling now, John? We're offering a special herbal tea today for customers who suffer from migraines and, because you're a preferred customer, we'd like to offer you a "friends and friends package" that bundles a 20 oz. cup of tea with a vegan muffin."

Although the embodiments of FIG. 2 described here present steps 200-250 in a particular sequence, this should not be construed to limit embodiments of the present invention to exactly that sequence. Some steps may be performed in different order without straying from the underlying inventive concept of the present invention. The sensory data of step 235 may, for example, be received after ancillary data of step 240, and steps 235 and 240 may be performed for each combination of location and domain prior to writing the scribble data to the repository of step 225. Many other variations are possible.

What is claimed is:

1. A method for inferring insights from enhanced user input comprising:
   accessing, by a computerized communications system, information that characterizes a user, wherein the information that characterizes the user is selected from the group consisting of: a unique identifier of the user, a domain of interest, and a user-defined personal preference;
   accepting, by the computerized communications system, a scribble data entered by the user, wherein the scribble data comprises data entered by the user on a scribble device and the scribble data comprises an element selected from the group consisting of: text, a graphic, a photographic image, a gesture, a selection, and a link to other data, and wherein the scribble device is a mobile device configured to communicate with the computerized communications system and the scribble device incorporates a GPS component;
   associating, by the computerized communications system, the user with a location, by means of the incorporated GPS component;
   receiving, by the computerized communications system, one or more elements of sensory metadata associated with the scribble data from a set of physical sensor devices, wherein each physical sensor device of the set of physical sensor devices is selected from a group consisting of: a sound-sensing sensor, an electromagnetic sensor, a motion-sensing device, an optical sensor, and a biometric sensor;
   limiting, by the computerized communications system, the sensory metadata to a subset of the one or more elements of received sensory metadata as a function of the location associated with the user;
   retrieving, by the computerized communications system, ancillary data in response to the accepting the scribble data entered by the user, wherein the ancillary data adds context to the scribble data;
   enhancing, by the computerized communications system, the scribble data by adding the ancillary data and the limited sensory metadata to the scribble data; and
   identifying, by the computerized communications system, an insight related to the user as a function of the enhanced scribble data and of the accessed information, wherein the identifying an insight related to the user comprises the computerized communications system forwarding the enhanced scribble data to a third-party online service and the computerized communications system receiving the insight from the third-party online service, and wherein the insight is selected by the third-party online service as a function of the enhanced scribble data.

2. The method of claim 1, wherein the ancillary data is entered by the user on the scribble device.

3. The method of claim 1, wherein the ancillary data is retrieved from an extrinsic source selected from the group consisting of: a social network, a publicly accessible data repository, and a privately owned data repository.

4. The method of claim 1, wherein the domain of interest is selected by traversing a path of domains organized into a hierarchical data structure.

5. The method of claim 1, further comprising providing at least one support service for at least one of creating, integrating, hosting, maintaining, and deploying computer-readable program code in the computerized communications system, wherein the computer-readable program code in combination with the computerized communications system is configured to implement the accessing, accepting, associating, receiving, limiting, retrieving, enhancing, and identifying.

6. A computerized communications system comprising:
   a processor;
   a memory coupled to the processor;
   a scribble device, wherein the scribble device is a mobile device configured to communicate with the computerized communications system and the scribble device incorporates a GPS component; and
   a computer-readable hardware storage device coupled to the processor, wherein the computer-readable hardware storage device containing program code configured to be run by the processor via the memory to implement a method for inferring insights from enhanced user input comprising:
   accessing, by the computerized communications system, information that characterizes a user, wherein the information that characterizes the user is selected from the group consisting of: a unique identifier of the user, a domain of interest, and a user-defined personal preference;
   accepting, by the computerized communications system, a scribble data entered by the user, wherein the scribble data comprises data entered by the user on the scribble device and the scribble data comprises an element selected from the group consisting of: text, a graphic, a photographic image, a gesture, a selection, and a link to other data;
   associating, by the computerized communications system, the user with a location, by means of the incorporated GPS component;
   receiving, by the computerized communications system, one or more elements of sensory metadata associated with the scribble data from a set of physical sensor devices, wherein each physical sensor device of the set of physical sensor devices is selected from a group consisting of: a sound-sensing sensor, an electromagnetic sensor, a motion-sensing device, an optical sensor, and a biometric sensor;

limiting, by the computerized communications system, the sensory metadata to a subset of the one or more elements of received sensory metadata as a function of the location associated with the user;

retrieving, by the computerized communications system, ancillary data in response to the accepting the scribble data entered by the user, wherein the ancillary data adds context to the scribble data;

enhancing, by the computerized communications system, the scribble data by adding the ancillary data and the limited sensory metadata to the scribble data; and identifying, by the computerized communications system, an insight related to the user as a function of the enhanced scribble data and of the accessed information, wherein the identifying an insight related to the user comprises the computerized communications system forwarding the enhanced scribble data to a third-party online service and receiving the insight from the third-party online service, and wherein the insight is selected by the third-party online service as a function of the enhanced scribble data.

7. The computerized communications system of claim 6, wherein the ancillary data is entered by the user on the scribble device.

8. The computerized communications system of claim 6, wherein the ancillary data is retrieved from an extrinsic source selected from the group consisting of: a social network, a publicly accessible data repository, and a privately owned data repository.

9. A computer program product, comprising a non-transitory computer-readable storage medium having a computer-readable program code stored therein, the program code configured to be executed by a computerized communications system comprising a processor, a memory coupled to the processor, and a computer-readable hardware storage device coupled to the processor, the non-transitory computer-readable storage medium containing program code configured to be run by the processor via the memory to implement a method for inferring insights from enhanced user input comprising:

accessing, by the computerized communications system, information that characterizes a user, wherein the information that characterizes the user is selected from the group consisting of: a unique identifier of the user, a domain of interest, and a user-defined personal preference;

accepting, by the computerized communications system, a scribble data entered by the user, wherein the scribble data comprises data entered by the user on a scribble device and the scribble data comprises an element selected from the group consisting of: text, a graphic, a photographic image, a gesture, a selection, and a link to other data, and wherein the scribble device is a mobile device configured to communicate with the computerized communications system and the scribble device incorporates a GPS component;

associating, by the computerized communications system, the user with a location, by means of the incorporated GPS component;

receiving, by the computerized communications system, one or more elements of sensory metadata associated with the scribble data from a set of physical sensor devices, wherein each physical sensor device of the set of physical sensor devices is selected from a group consisting of: a sound-sensing sensor, an electromagnetic sensor, a motion-sensing device, an optical sensor, and a biometric sensor;

limiting, by the computerized communications system, the sensory metadata to a subset of the one or more elements of received sensory metadata as a function of the location associated with the user;

retrieving, by the computerized communications system, ancillary data in response to the accepting the scribble data entered by the user, wherein the ancillary data adds context to the scribble data;

enhancing, by the computerized communications system, the scribble data by adding the ancillary data and the limited sensory metadata to the scribble data; and identifying, by the computerized communications system, an insight related to the user as a function of the enhanced scribble data and of the accessed information, wherein the identifying an insight related to the user comprises the computerized communications system forwarding the enhanced scribble data to a third-party online service and receiving the insight from the third-party online service, and wherein the insight is selected by the third-party online service as a function of the enhanced scribble data.

10. The computer program product of claim 9, wherein the ancillary data is entered by the user on the scribble device.

11. The computer program product of claim 9, wherein the ancillary data is retrieved from an extrinsic source selected from the group consisting of: a social network, a publicly accessible data repository, and a privately owned data repository.

* * * * *